(12) United States Patent
Deutschmann et al.

(10) Patent No.: US 10,848,309 B2
(45) Date of Patent: Nov. 24, 2020

(54) FIDO AUTHENTICATION WITH BEHAVIOR REPORT TO MAINTAIN SECURE DATA CONNECTION

(71) Applicant: BehavioSec Inc, San Francisco, CA (US)

(72) Inventors: Ingo Deutschmann, Frankleben (DE); Per Burstrom, Lulea (SE)

(73) Assignee: BEHAVIOSEC INC, San Francisco, CA (US)

( * ) Notice: Subject to any disclaimer, the term of this patent is extended or adjusted under 35 U.S.C. 154(b) by 0 days.

(21) Appl. No.: 16/919,306

(22) Filed: Jul. 2, 2020

(65) Prior Publication Data

US 2020/0336308 A1 Oct. 22, 2020

(51) Int. Cl.
*H04L 29/06* (2006.01)
*H04L 9/32* (2006.01)
*H04L 9/08* (2006.01)

(52) U.S. Cl.
CPC ............ *H04L 9/321* (2013.01); *H04L 9/0894* (2013.01); *H04L 9/3236* (2013.01); *H04L 9/3247* (2013.01); *H04L 9/3271* (2013.01); *H04L 63/0442* (2013.01)

(58) Field of Classification Search
CPC ..... H04L 9/321; H04L 9/0894; H04L 9/3226; H04L 9/3247; H04L 9/3271; H04L 63/0442

See application file for complete search history.

(56) References Cited

U.S. PATENT DOCUMENTS

| | | | |
|---|---|---|---|
| 9,529,987 B2* | 12/2016 | Deutschmann | G06F 21/32 |
| 9,935,953 B1* | 4/2018 | Costigan | H04L 63/0876 |
| 10,075,437 B1 | 9/2018 | Costigan et al. | |
| 10,437,971 B2 | 10/2019 | Deutschmann et al. | |
| 2015/0294313 A1* | 10/2015 | Kamal | G06Q 20/401 705/44 |
| 2018/0351944 A1* | 12/2018 | Cho | H04L 9/3271 |
| 2018/0365399 A1* | 12/2018 | Deutschmann | H04L 63/0884 |
| 2019/0097812 A1* | 3/2019 | Toth | H04L 9/3213 |
| 2019/0124081 A1* | 4/2019 | Nowak | H04L 63/0892 |
| 2020/0092284 A1* | 3/2020 | Zhu | H04L 63/061 |
| 2020/0145219 A1* | 5/2020 | Sebastian | H04L 63/0861 |

OTHER PUBLICATIONS

"How FIDO Works", https://fidoalliance.org/how-fido-works/ [Date accessed: Apr. 23, 2020].

* cited by examiner

*Primary Examiner* — Sher A Khan
(74) *Attorney, Agent, or Firm* — Michael J. Feigin, Esq.; Feigin and Fridman LLC (57) ABSTRACT

FIDO authentication is augmented to include a behavioral score indicating that during a secure network session between a host and client device, the client device is being operated by a user with expected behavioral actions. The authenticated network session is maintained, stepped-up, or ended based on either or a combination of a positive response to a FIDO challenge and threshold of match between a current behavioral profile and a stored behavioral profile for the user.

11 Claims, 5 Drawing Sheets

FIDO AUTHENTICATION WITH BEHAVIOR REPORT TO MAINTAIN SECURE DATA CONNECTION

FIELD OF THE DISCLOSED TECHNOLOGY

The disclosed technology relates to client and server FIDO authentication, and, more specifically to maintaining a secure network connection based on how a client-side device is used.

BACKGROUND OF THE DISCLOSED TECHNOLOGY

The FIDO protocol uses public key cryptography for user and/or device authentication. A signed encryption key is used with a combination of public and private keys. The authentication is performed client-side with the private key and sent to a server over a network as part of a signed and hashed answer to a challenge request received. On the end-user device, a user provides an input to authenticate using a pin code, second factor device, fingerprint scan, or other data input or biometric input.

A problem with the current FIDO protocol arises if someone else uses or gains access to a computer system which has been authenticated. This can be accomplished by physically being at the computer, using a remote bot, or otherwise gaining illicit remote access to a computing device.

SUMMARY OF THE DISCLOSED TECHNOLOGY

Objects of the disclosed technology include having a more secure (cryptographic) use of computer networks, increase the effectiveness of security protocols, and provide better cryptography systems. Further objects include improving the reliability of the FIDO protocol and usefulness of data passed between a server and client device using the FIDO protocol.

A FIDO ("Fast IDentity Online") authentication scheme is used in embodiments of the disclosed technology to authenticate a secure data connection in order to transmit and receive encrypted data. The disclosed technology helps ensure that the recipient device is also being operated by a same person or entity who did so when the connection was first authorized or previously authorized by this person or entity. This is accomplished by adding a behaviometric component to a response sent to a challenge provided using the FIDO protocol.

FIDO authentication is carried out by exchanging secure data between a server and client device such as by receiving a request from a first network node at a second network node to establish an authenticated secure data network connection between devices at a respective first and second network node.

Hashed and signed data from the second network node is then sent to the first network node in order to authenticate a secure data network session between the network nodes. "Hashed" is defined as "taking an input and producing a value of a fixed size as a form of at least two of data compression, data integrity validation, and compression." A "network node" is a "hardware device which receives packet-switched data as a final destination thereof and/or which re-sends a version of the data to another such node."

A behavioral profile is created on the device at the second network node. A "behavioral profile" is a collection of data about how a particular user uses a device such as how they touch a screen (swipe speed, position, length of time, pressure), hold the device (angle, longevity, jitter, movement), and other measurements of use of the device. Inputs in the device which receive data about usage (gyroscope, accelerometer, thermometer, touch screen, microphone, fingerprint scanner, camera, and/or others) are used to monitor and determine behavioral characteristics during the secure data network session. The "data network session" is defined as "the sum of, or majority of, data exchanged between two devices over a data network after the secure data connection is authenticated and until the secure data connection is no longer believed to be authenticated or is determined to be closed."

A change in behavioral characteristics is determined over time, the change occurring during the authenticated data network session and/or based on comparisons with previous usage of the second (end user) devices such as while authenticated in other sessions with the first network node and/or an entity or device residing at the first network node. Thus, behavioral data from previous use of the user device is used in some embodiments to determine if the way the device is being used has changed.

During the secure data network session, at the second network node a FIDO authentication challenge is received and/or a FIDO response is sent. The challenge can be sent as a result of receiving data from the second network node to carry out a specific action requiring FIDO authentication by any service provider employing the FIDO authentication scheme, such as involving payments, requesting money be transferred or private data be sent. The challenge request can also be continuously posted (defined as "periodic at intervals as reasonably close together as able to be processed by the devices used to authenticate the FIDO session without slowing the operation of the devices").

The response to the FIDO authentication challenge is then sent from the second network node to the first network node as per the FIDO protocol known in the art. The response in this technology attempts to or does indicate that the data network connection is still within the authentication parameters required by the FIDO protocol. With the response, which is a signed FIDO response, additional data is included indicating the extent to which the behavioral characteristics match the behavioral profile for the device at the second network node. This can be a numbered score or specific data with respect to particular behavioral changes during the secure network session and/or in comparison to behavior of the user in the past. The response of the behavioral profile can be compared to that which was determined during a training phase for a particular user, the user currently operating a device and having been authenticated via the FIDO authentication, at the second network node.

The FIDO response sent can additionally include a level of risk in some embodiments. That is, the risk, based on changes in the behavioral profile compared to a training phrase or prior behavioral profile, can be determined at the second (user) device. Alternatively, the server (device at the first network node) can make such a determination of risk based on the FIDO response received which includes data about the behavioral profile information received in response to an authentication challenge or otherwise. The device connected to the first network node uses the level of risk to continue to send, change, or block further data sent from the first network node to the second network node.

In some embodiments or iterations of carrying out the disclosed technology, the signed FIDO response fails to authenticate the secure data network connection. However, data indicating the extent to which the behavioral characteristics match the behavioral profile is used by the device at the first network node to accept the FIDO response as authenticated. In other words, an improperly signed FIDO response which would typically indicate that the data network session is no longer authenticated (e.g. improper password entered, fingerprint not matching, device returns wrong security key), can be overridden and treated as an authenticated session due to a determination that the behavioral usage of the device shows that the same user is still using the device.

Private data (data specific to, and/or which identifies a particular person and/or allows access to secure data intended for a particular person) is sent from the second device to the first device as a result of the authenticated FIDO response in some embodiments. This can happen when the FIDO response failed to authenticate and the behavioral profile matched above a threshold. Such a threshold is one which is set before carrying out the step of authenticating in embodiments of the disclosed technology and is based on a tolerance level or deviation from expected behavioral usage of a device. The level of risk can be based on determining that behavioral usage is as a result of the presence of a malfeasant, which is a third-party actor or device which sends/receives data made to appear as if, or which does, originate from the second device at the second network node. This can be a bot (computer code executed to carry out instructions and cause the first device to act in a specific way), remote access tool (human sending data by way of different network connection to control the user device which has been authenticated), or malware (computer code executed to steal data or funds). Stepped up authentication is achieved by way of a FIDO authentication based on biometric, secure second-factor device, or other authentication mechanisms and/or collection of behaviometric data for a user of a device, after a first authentication has occurred (typically username and password). The first authentication allows access to a first set of data and the stepped-up authentication allows access to a second set of data inaccessible prior to the stepped up authentication.

For purposes of this disclosure, the following definitions are used. "Relying party" is a service provider hosting a service to secure a data packet-switched data connection between two parties using FIDO authentication. The relying party can be a vendor, subscription service or the like. "Authentication" is the verification of that a user is allowed to access certain data based on receiving an input from or related to the user including any of biometric, behaviometric, and/or inputs to sensors including key presses, passwords, code numbers, and patterns. "User verification" is the verification that occurs locally in a FIDO authenticator on an end-user device as a result of the user interacting with the FIDO authenticator by providing biometric, PIN or second-factor device as proof of identity, which unlocks the private cryptographic key for signing that will enable authentication to the relying party. "Biometric" is data which relates to the biology or physiology of a user including a retinal pattern, fingerprint, or face configuration. "Behaviometric", used interchangeably as an adjective with "behavioral", is data pertaining to a manner of operation of a device as recorded by one or a plurality of sensors in the device or by way of external sensors in other devices. This includes accelerometers, gyroscopes, touch sensors (including touch screens), and processors which measure any or a combination of device angle, key press, position on a screen pressed, swipe speed, swipe intensity (pressure), temperature, and so forth.

"Data" is any tangible information which can be or is stored on a physical disk, volatile memory, and/or transferred via a network connection.

Disclosed herein is a method of operating a device to interact with a user, comprising steps of using a first sensor (a device which receives input from the physical world and creates electrical impulses which can be or are converted to data) to receive data about a user (a person or device imitating a person to operate or attempt operation of a device) and granting basic authorization to use the device. "Basic authorization" is defined as authorization to access some data with the device while other data remains inaccessible to the user until a "stepped up" or "second" authentication occurs.

After granting the basic authorization, the user uses the device on which the authorization was granted and the first sensor and/or a second sensor records implicit behavioral inputs by the user. "Implicit" inputs are inputs which vary and change over time in some instances and/or are tied to patterns of use. "Explicit" inputs are those which, under normal circumstances, remain constant or substantially constant over time. "Time" for purposes of the prior definition can be defined as three months, one year, ten years, and/or a lifetime. For example, retinal patterns under normal circumstances (for the majority of people) remain substantially constant through one's entire adult life but for an accident (for a minority of people) whereas an angle of swiping the screen while scrolling (a behaviometric) can change over time and be substantially different even from one act to the next. However, behaviometric inputs often create recognizable patterns.

A request to access data unavailable to the user with the basic authorization is then received and using a sensor (any of those previously described or yet another sensor), explicit biometric input about (from) the user are then received. Based on a combination of the implicit behavior inputs and the explicit biometric input, access to the unavailable data (also referred to as "stepped up authentication") is granted and at least some of the previously unavailable data is sent to the user.

Behavioral inputs can be compared to the prior recorded implicit behavioral inputs using one or more statistical tests to determine a threshold of closeness between past and present implicit behavioral inputs. "Statistical tests" for purposes of this disclosure are defined as determining a distance of new behavioral samples of a variable (e.g. any/all keys or bigram flight times etc.) to the previously sampled distribution (the learned profile). In some embodiments, this is carried out by comparing the samples to a mean value of an assumed underlying distribution, which can be e.g. Gaussian or log-normal, or computing the Kullback-Leibler divergence which is a measure of the "surprise" or information gain of new samples to an underlying distribution, or if sufficient samples are available, perform a two-sample Kolmogorov-Smirnov or a Cucconi test to determine the similarity. In each of the above methods, a suitable accept/reject threshold (or "critical value") is set.

The threshold of closeness between past and present behavioral inputs determines a minimum required percentage match of the explicit biometric input to grant said access to the unavailable data (the stepped up authentication) or maintain an authenticated session. The percentage match can be a match of how much of the input has been received (e.g. a ¾ of a fingerprint has been received), how much of the input matches that which is on record already (e.g. ¾ of the received fingerprint scan matches while ¼ does not), and/or closeness of the match based on a statistical determination (e.g. 60% overall match). The percentage match of said explicit biometric input is a portion of a facial, retinal, and/or fingerprint scan depending on the embodiment of the technology. The percentage match can include a partial match from two or more of the facial, the retinal, and/or the finger print scan. Thus, the combination of partial matches can be enough to meet a minimum percentage threshold to grant access.

If an implicit behavioral input changes, a more explicit biometric input for granting access to the unavailable data is required than if the behavioral input remains constant or changes less. In other words, in embodiments of the disclosed technology, the more a behavioral input or combination of behavioral inputs change, the more of a biometric input, percentage thereof, or closeness of a statistical match between biometric inputs must be achieved in order to grant access to the previously unavailable data (the stepped up authentication).

Any device or step to a method described in this disclosure can comprise or consist of that which it is a part of, or the parts which make up the device or step. The term "and/or" is inclusive of the items which it joins linguistically and each item by itself. "Substantially" is defined as "at least 95% of the term being described" and any device or aspect of a device or method described herein can be read as "comprising" or "consisting" thereof.

DETAILED DESCRIPTION OF EMBODIMENTS OF THE DISCLOSED TECHNOLOGY

In a first step of authentication, a user using an end user computing device at a network node enters its credentials, such as providing biometric or other input data. During the user session, behavioral usage of the device is recorded. This can be in addition to recording behavioral usage in previous authenticated sessions for the particular user who is identified by the device being used and/or the data used to authenticate the user (e.g. username/password). Where "FIDO" is used, this can include any authentication scheme requiring a public/private key pair and challenge/response systems used to continue to authenticate a user. In some embodiments, the behavioral usage data determines when data is sent to the user, regardless of whether the FIDO challenge was otherwise answered successfully providing an authenticated signed and hashed key.

Embodiments of the disclosed technology will become more clear in view of the following description of the figures.

Figure 1:
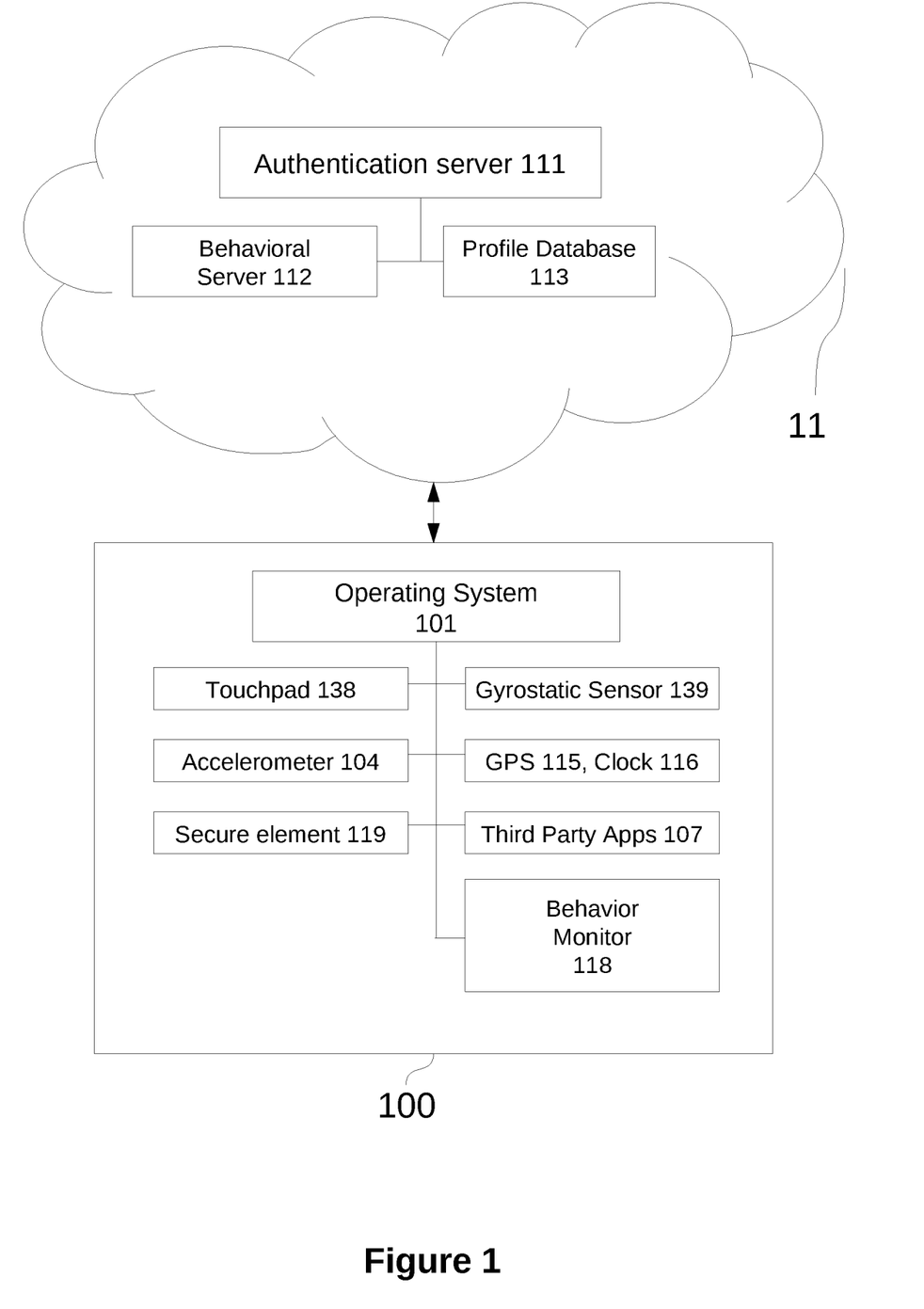
FIG. 1 shows a schematic overview of an exemplary system for authentication of a user according to an embodiment of the disclosed technology.

FIG. 1 shows a schematic overview of an exemplary system for authentication of a user according to an embodiment of the disclosed technology. The system includes a computing device 100, having connection to at least one wireless packet-switched network 11, as well as one or more sensors as described hereinbelow. The computing device 100 may be a mobile computing device, defined as any portable electronic device with a processor that carries out instructions, and having at least one wireless packet-switched network connection, an input for user interaction, and a visible display with which a user may interact. Examples of mobile computing devices 100 may be, but are not limited to, mobile phones, tablets, personal digital assistants (PDAs), laptops, netbooks, smart watches, e-readers, and/or digital cameras. The computing device 100 may be a desktop computer, defined as any traditional stationary or portable electronic device with a processor that carries out instructions, and having at least a network connection, an input for user interaction, and a visible display with which a user may interact.

Referring still to FIG. 1, the components of a mobile computing device 100 are shown. All of the components of the mobile computing device 100 are tied to an operating system 101, which is defined as coded instructions configured to instruct a hardware device to carry out mathematical operations or electrical interactions with physical components electrically or wirelessly connected to one another, as well as user interaction therewith. Examples of operating systems may include iOS, Android, BlackBerry OS and Microsoft operating systems.

Physical components of device 100 include one or more of a touchpad 138, a gyrostatic sensor 139, an accelerometer 104, and a GPS 115. Each of these physical components may typically already be found in most mobile computing devices 100.

When employed by the present invention, the physical components are used to detect and monitor movements or activities carried out by the user with respect to the device 100. Such movements may include, for example, an orientation and/or angle at which a user holds a mobile device 100 during operation thereof. For example, a particular user may typically hold the mobile device 100 at a horizontal, landscape orientation, with the display tilted at a 45 degree angle with respect to the ground. Such behavior, if consistently exhibited, may be stored and associated with a user profile pertaining to the particular user as explained hereinbelow, and may be used to authenticate a user to grant security clearance as described hereinbelow. A touchscreen which outputs any of pressure placed on the screen, position, swipe speed, swipe location, and other data indicating how the touchscreen has been used can also be used in this step. Likewise, a fingerprint scanner or camera can be used to quantify user behavior.

Other components of the mobile device 100, which may be monitored, include a clock 116 and/or third party applications 107. Times during which a particular user carries out particular functions may be indicative and dispositive that the particular user should be granted security clearance. For example, if a particular user opens a news application every morning around 7:30 AM, such behavior may be stored as part of the user's profile and may be considered a recognizable pattern indicative of the particular user of the device 100.

Additional components may be included in the device 100 for purposes of monitoring, recording, and/or sending behavioral data. One such component is a behavior monitor 118. The behavior monitor 118 may be incorporated into software that is installed onto the device 100. Alternatively, the behavior monitor 118 may be incorporated into the operating system 101. The behavior monitor 118 uses network connection 11 of the device 100 to send behavioral data to and receive behavioral data from a suitable server or remote location. The behavior monitor 118 may run in the background, and collect all available behavioral data.

The behavior of the user might be also gathered by including specific software into Third Party Applications 107 which allow gathering of information regarding user behavior. In embodiments of the disclosed technology, the Third Party Application is a FIDO client/server which authenticates the user and device which the user is using in order to allow access to data residing on another network node on a packet-switched network which is intended for the user.

In some embodiments, the behavior monitor 118 runs continuously, so that the system might provide a constant data feed. The behavior monitor 118 may use a secure element 119 for encryption, decryption, digital signing, and/or signature checking operations. The behavior monitor 118 is operable to use all available network capabilities of device 100 such as Global System for Mobile Communications (GSM), Bluetooth, Near Field Communication (NFC), etc., to send collected behavioral data to an authentication server 111, and is capable of receiving data from the authentication server 111. The behavioral data may be formatted using Extensible Markup Language (XML), JavaScript Object Notation (JSON) or other suitable structured data format. User information and optional reference information about the used cryptographic keys may also be formatted using XML, JSON or other suitable structured data format.

The behavior monitor 118 may also be in communication with a behavioral server 112, by which behavioral data may be analyzed and cross-referenced to a profile database 113. The profile database 113 may also be accessed remotely via network communication, and may contain personalized behavioral data for different users. The behavioral server 112 as well as the database 113 might reside on the device 100, or might be accessed remotely as shown in FIG. 1.

The behavior monitor 118 is operable to interpret behavioral input by monitoring system events of the operating system 101. In order to be independent of user actions like installing software or deleting software, the behavior monitor 118 may be realized as a system service or included into the source code of the operating system 101.

The behavioral input data may be pre-processed locally by the behavior monitor 118, using appropriate filters and templates for particular behaviors. This may be carried out, for example, by decreasing the granularity of the available data sources such as the gyrostatic sensor 139 and the accelerometer 104. User touches or pressure values might be filtered to better distinguish the user behavior. Furthermore statistical data about the behavior of the user may also be gathered while the user is using the device 100.

The behavioral input data may be filtered by omitting outlier data from the behavior, or by using statistical or weighted methods, to gather data better suited for further processing. The behavioral data that is analyzed may include touch gestures, keyboard actions (dwell, flight time), and movements of the device as determined based on data captured from the gyrostatic sensor 139, the accelerometer 104, and GPS 115.

The secure element 119, which may be included on the device 100, may be used for confirming or rejecting an identity of a user. The secure element 119 might be a simple Subscriber Identity Module (SIM) Universal Integrated Circuit Card (UICC), Trusted Platform Module (TPM), NFC module or another smart card or device that is capable of storing a secret key or a private/public key pair and is able to perform cryptographic operations therewith.

The secure element 119 might be included in the device 100 or may be otherwise connected to it, such that it may be accessible via an application installed on the device 100. This may be carried out using several wire-bound or wireless protocols, including, but not limited to, Universal Serial Bus (USB), Bluetooth, NFC, Radio-Frequency Identification (RFID) or other suitable protocols. The secure element 119 may also comprise a secured application capable of holding a secret or private/public key pair and able to carry out cryptographic operations therewith, a combination of an application with a protected storage, or an application using a cryptographic co-processor.

The secure element 119 may contain a symmetric key or an asymmetric key pair, and a server key. Cryptographic keys may be included in the secure element 119 at production time of the secure element. Cryptographic keys may be included via a bootstrap process and may later be updated using secure means. The cryptographic keys might also be generated in the secure element 119 and authenticated, using traditional Public-Key Infrastructure (PKI) means like signed Public-Key Cryptography Standard #10 (PKCS10) and certificates.

Figure 2:
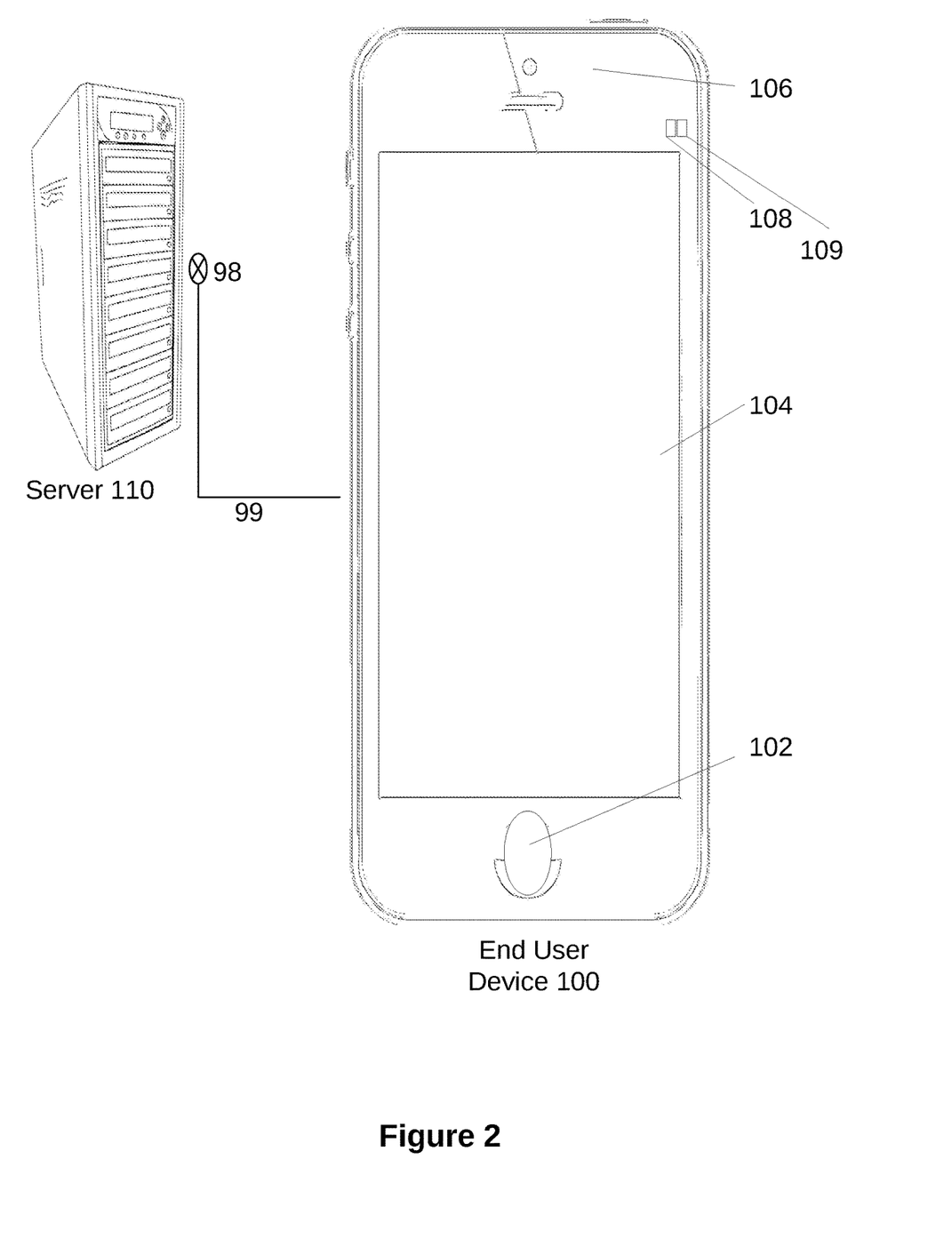
FIG. 2 shows a high level diagram of devices used to carry out embodiments of the disclosed technology.

FIG. 2 shows a high level diagram of devices used to carry out embodiments of the disclosed technology. Here, the server 110 sends content over a packet-switched network 99 by way of a network node 98. The end user device 100 receives this content/data and stores content or retrieves previously stored content using a storage device 108. When the server 110 delivers content to the end user device 100, this can be secure content intended only for an authenticated user of the end user device 100 requiring a basic and/or stepped up authentication. Such data can also be stored on the storage device 108 and retrieved only after authentication.

The end user device 100 has data stored thereon, as described above, or is retrieved from a network, only after a user's identification or a security code is received to confirm the user can access such data and deliver or exhibit such data to the user and/or otherwise make the data available to a user of the device. The authentication can be achieved by hearing the user's voice, receiving an entered password using a touch screen 104, receiving a finger print using a finger print scanner 102, receiving a picture of the user using a camera 106 or the like. Once this basic authorization is received, the user can access the device and the device begins or continues to receive behaviometric data (see definition in the "summary"). The behavioral characteristics of a user include statistical measures of at least one or a plurality of key press times, key flight times, mouse movement, device description, user agent (meaning operating system, browser type, model, and version), screen refresh rate, pressure sensor readings and more. Behaviometric data changes over time in some instances whereas biometric data is more likely to remain constant or substantially constant. The behaviometric data is received using any of, or a combination of, the touch screen 104, and an accelerometer and/or gyroscope 109 which measures direction, angle and/or velocity of the device. The behaviometric data recorded can also vary based on what is displayed on the screen 104. For example, when a keyboard is displayed, inputs (such as presses or swipes) can be seen differently when directed at the keyboard (signifying entry of text)

compared to when a swipe is used for example, to move/ scroll a window. Each device which receives input is a form of a sensor, for purposes of this disclosure.

Figure 3:
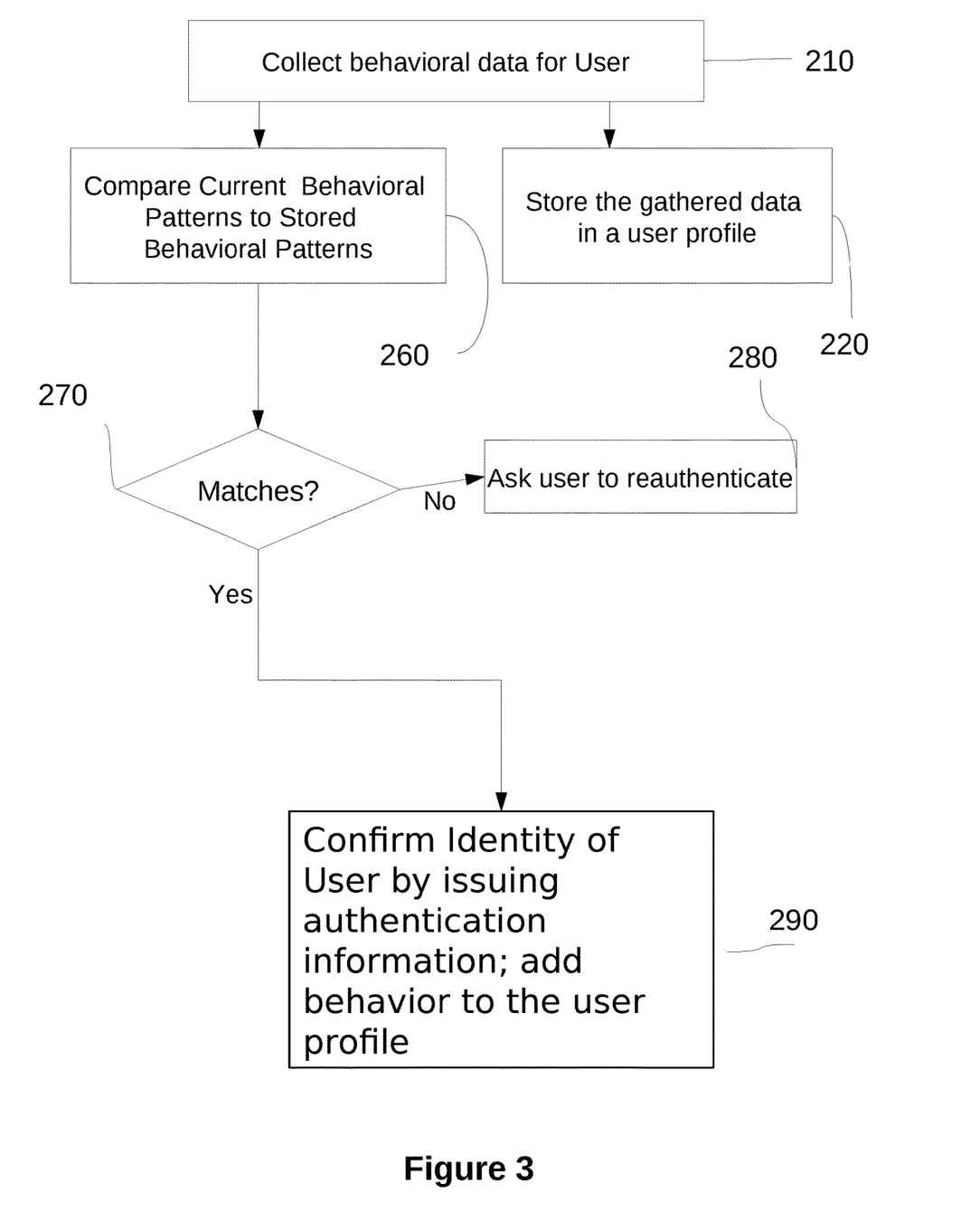
FIG. 3 shows a flow chart of steps taken in a method of authenticating a user according to an embodiment of the disclosed technology, using a computing device as described with reference to FIGS. 1 and 2.

FIG. 3 shows a flow chart of steps taken in a method of authenticating a user according to an embodiment of the disclosed technology, using a computing device as described with reference to FIGS. 1 and 2. The steps shown can take place on a user device at a second network node entirely, or steps of comparing current and past behavioral patterns 260, matching a user 270, and confirming a current user 290 can take place at a device at a first network node separate and distinct from a network node where the user device resides.

In a first step 210 of the method, the behavior monitor gathers behavioral data for the first user via the device. The behavioral data may originate from the touchscreen or touchpad, the gyrostatic sensor, the accelerator, the positioning sensor, or any other component of the device.

In a second step 220, which occurs during a first use of the device by the user, the gathered behavioral patterns are stored in a user profile, for example on a suitable behavioral database. In some embodiments, the behaviors are stored as part of a general profile associated with an account being accessed. In other embodiments, the behaviors are stored in a first profile or sub-profile specific to the first user.

Alternately, at step 260, which occurs during a subsequent use of the device by the user, stored behavioral patterns are retrieved, as a user profile, from the database, based on provided user information, and the behavior monitor then compares the currently collected behavioral patterns to the stored behavioral patterns. The matching of the behavioral data to profiles in the database may be carried out using traditional statistic algorithms, or using other available algorithms like Support Vector Machine (SVM) or Bayes nets or any other suitable algorithms. Thresholds on the similarity of the profile and the provided behavioral information may be used to drive this decision.

If no match is found for the data at step 270, access to the device or remote data may be prohibited in step 280, or the user may be asked to provide additional means of authentication. Alternatively, the granularity may be adjusted to encompass a broader range of behavioral attributes until a possible match is found.

If a match is found in step 270, at step 290 the identity of the user is confirmed, and suitable authentication information is issued. Additionally, the current behavioral information is used to update the user profile associated with user A. In some cases following confirmation of the identity of user A, a private key of the user is decrypted and used for authentication against third parties, which might be carried out by signing some information or encrypting a token generating authentication information. The needed secure element keys or certificates may be generated either at production time of the secure element, or in an installation/updating phase of the secure element.

Using the authentication information, it is possible to grant access to specific data, such as data requiring stepped up authentication, from a server 111 in step 290. The authentication information may be shared with third party applications on the device which may require security clearance. Those applications requiring security clearance may be considered "protected services" for purposes of this specification. For example, a mobile banking application may require a certain level of security clearance before granting access to certain features thereof. The access granted in step 290 may otherwise be subject to other security measures, such as, for example, the entering of a PIN, the authentication of a fingerprint, or some other biometric security measure.

Once authentication is initially confirmed, a behavioral authenticated dialogue may be started with the protected service using the authentication information provided by the behavioral monitor. Behavior pertaining to the protected service may continue to be recorded and monitored after access is granted. This is shown more specifically with reference to FIG. 4, as discussed below.

Figure 4:
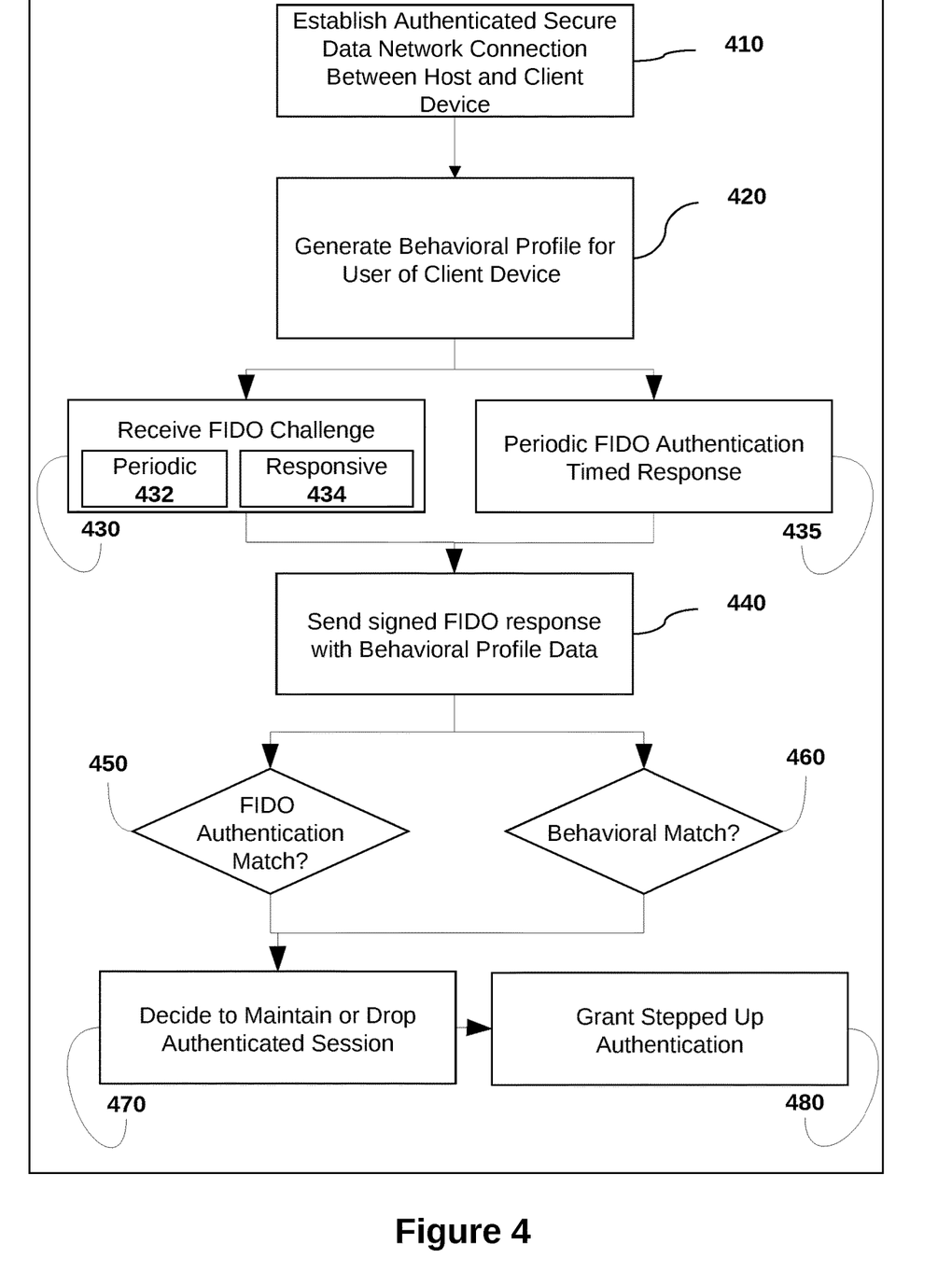
FIG. 4 shows steps carried out to maintain a FIDO authenticated session based on behavioral actions carried out by a user of a device.

FIG. 4 shows steps carried out to maintain a FIDO authenticated session based on behavioral actions carried out by a user of a device. Here, a FIDO authenticated session is established in step 410 between a host computer (first device, e.g. server or host 110) and client device (second device, e.g. end user device 100). This authenticated secure data network connection is based on the exchange of a public and private key using the FIDO protocol, which, for purposes of this disclosure is inclusive of variants such as CTAP2, WebAuthn, FIDO2, CTAP1/U2F, U2F and other future protocols which work based on client-side verification combined with server side authentication and secure data provided there-between.

Once the secure data network connection is established and the identity of the user of the device is verified, then behavioral information, as described with reference to FIGS. 1, 2, and 3, is generated and a profile is created for the user and his/her behavior in step 420. This can include user behavior during the current authenticated session as well as prior user behavioral data determined during previous user sessions associated with the user. The behavioral profile can be constantly updated or changed as more data is available and/or the user's behavior changes. This is described in more detail, above. The behavioral profile, in some embodiments of the disclosed technology, is stored on the client device. In other embodiments, the behavioral profile is stored on the host device.

During the authenticated session, challenges are sent, either after request by the user device 100 or server 110, to the user device in order to receive a response requiring the private key on the user device in step 430. As such, only the user device is able to provide a proper signed and hashed response based on the public and private keys. Such a FIDO challenge request received in step 430 can be periodic 432, or responsive to a user's action 434. Periodic can include a continuous polling and response such as every second or quicker. A response challenge can be as a result of an action carried out by a user requiring greater or a renewed security check such as a money transfer or access to sensitive personal data. Such a request requires, in some embodiments, stepped up or enhanced authorization beyond a first authorization. That is, two factor authentication may be required for the stepped up authentication, for example.

In some embodiments, the FIDO authentication request is a periodic and timed response or initiation of authentication data sent via a packet switched network to the server/host, as shown in step 435. Some embodiments use a combination of steps 430 and 435.

Then a signed and hashed FIDO response is sent, in step 440, either in response to the FIDO challenge received or as part of a periodic sending of data used to maintain the authenticated network session. The received data, at the host, is then parsed to determine if; a) the FIDO challenge has successfully been answered (step 450), and/or b) the behavioral use of the client-side device matches that of the behavioral profile (step 460). In step 450, a FIDO authentication match is made when the expected signed and hashed data is received and is determined to match a response from the user device. In step 460, the behavioral match is determined to be met if the FIDO response has a number which indicates that the behavior is within a preset threshold of acceptability for the user to continue to access data via the authenticated secure data network connection. The behavioral match data sent to the server can simply be a number such as a number from 1 to 10 or from 1 to 100 indicating how close the data since the past FIDO challenge or FIDO response continues to match and/or how close the data matches a behavioral profile currently in use.

In some embodiments of the disclosed technology, in step 450, the FIDO authentication data can match which, in the prior art, would be used to continue to maintain the authenticated session. However, in the present technology, when the behavioral data fails to match within a threshold in step 460, then in step 470, the host device may decide to no longer send secure, stepped-up (step 480), personal, or some other data to the user/client device. This is because such a result may indicate that another person is now operating the client device.

In some embodiments of the disclosed technology, in step 450, the FIDO authentication data received may fail to match which, in the prior art, would disable the secure data exchange. However, in the present technology, when the behavioral data matches within a threshold in step 350 to be deemed a match, then in step 470, the host device may consider this to be sufficient to maintain the secure data network connection. This may be the result of a failed PIN entry, fingerprint scan, or the like which causes the FIDO authentication failure but since the behavior on the device matches the user, the session is maintained. In such an instance, the behavioral match may be required to be within a higher threshold (lower tolerance for difference) to maintain the authenticated session than if the FIDO response matched. This is because when the FIDO response does not match, the server is designed to be more careful with sending secure data to a client. Here, it is thus a smaller extent of change of the behavioral characteristics allowed in some embodiments in order to maintain the authenticated session and/or allow stepped up authentication (step 480) when the FIDO response fails in step 450.

In a variation of the above embodiments of the disclosed technology which are incorporated into the following embodiment, the FIDO authentication scheme is carried out by way of multiple stages. In a registration stage, two devices are recognized by each other as having secure data exchanged between them via a public packet-switched network across multiple network nodes. This is established by a public/private key in a secure data exchange wherein said request contains a first challenge to be signed using a public cryptographic key, the public key generated by a device at the second network node as part of a public/private key pair. This key pair is generated after a user of the second device unlocks a device-local FIDO authenticator (a device physically connected to and/or software instructions operated by a user of the second device) which verifies the correct user to be present and generates a first correct signature. A second public/private key pair can also be generated in order to increase the security of the network and create a more secure environment. The private key or keys are stored securely on the device.

Then hashed and signed data with the first public key and the first correct signature are sent from the second network node to the first network node, where-after the second device requests from the first device a second FIDO challenge to sign using the second public key. The second public key and a second correct signature are sent in response and the registration process is completed, in some embodiments, by storing the public key pairs at the first network node.

In an authentication stage carried out after the registration stage, it is determined if the secure data connection between the first and second device is still secure (without intrusion by a third party, as described above), to establish an authenticated secure data network exchange between the devices using said first public/private key pair. This is carried out by requesting a FIDO challenge, to be signed using the correct key, from the first device to the second, the second using a local FIDO authenticator (device located at or otherwise connected to the second device). The local FIDO authenticator is used to sign the challenge with a correct signature, the correct signature only being possible to generate using the first private key, and typically, the key is only accessible if the FIDO authenticator can verify the user as being the genuine user by recognizing a biometric, a second-factor device signature, a PIN, or similar proof of identity. As such, the first private key is, in embodiments of the disclosed technology, only accessible by the original local FIDO authenticator of the second device if user verification succeeds. In other words, if the second device has been compromised and/or controlled by a third party, the user verification will fail and the first private key will be unavailable to the compromising party or device, resulting in an unsuccessful authentication.

The response from the second to first device is hashed and signed data comprising, if the step of user verification is completed successfully, the correct signature from said second network node to said first network node causing an authenticated secure data exchange session between the first and second network nodes, generating a behavioral profile for the device at the second network node based on monitoring inputs to the device at the second network node and determining behavioral characteristics of the inputs during said secure data network session. Other steps can be carried out as described in the above embodiments such as described with reference to FIG. 4.

If the step of user verification is not completed successfully, the FIDO response is sent with a flag indicating the genuine user is not present. Such a response given to a client-side request for FIDO authentication is considered a failed authentication and results in the user not being able to access the requested service. However, a "user not present" indication could be used for verifying only the presence of the device, for example, and requesting and receiving such responses from the server side is known in the FIDO community as a "silent authentication", where silent stems from the fact that it does not require user knowledge about the procedure. In embodiments of the disclosed technology, failed user verification does not lead to termination of an existing secure data exchange if a silent authentication message based on behavioral characteristics of the user is found to match the profile of the authenticated user above a threshold.

In registration, when a user is signing up for an account on a website, the authenticator generates a new key pair that can only be used to authenticate with a particular other party (e.g. device or entity controlling a plurality of devices which are part of a same service and/or devices connected to each other in a private network or an organization). The public key and an identifier for the credential are stored with the server (a first network device). In an authentication stage, when a user returns to the service on a new device, or after an authenticated session expires, the authenticator must provide proof of the user's private key. It does this by responding to a cryptographic challenge issued by the server. To verify the identity of the user, some types of authenticators use biometrics such as fingerprints or facial recognition. Others use a PIN. In some cases, a password is used to verify the user and the authenticator provides only second-factor authentication.

Figure 5:
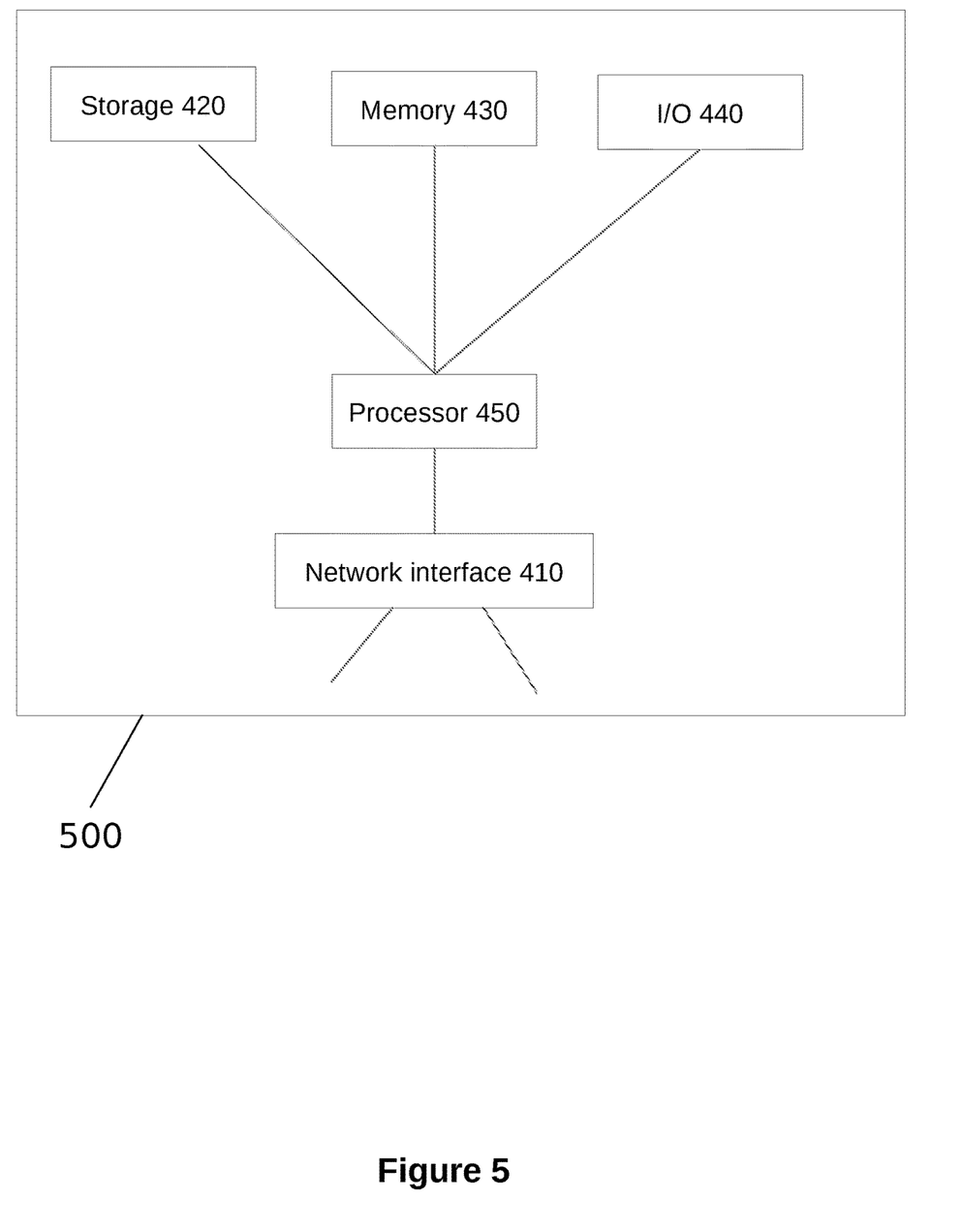
FIG. 5 shows a high level block diagram of devices used to carry out embodiments of the disclosed technology.

FIG. 5 shows a high-level block diagram of devices used to carry out embodiments of the disclosed technology. Device 500 comprises a processor 450 that controls the overall operation of the computer by executing the device's program instructions which define such operation. The device's program instructions may be stored in a storage device 420 (e.g., magnetic disk, database) and loaded into memory 430 when execution of the console's program instructions is desired. Thus, the device's operation will be defined by the device's program instructions stored in memory 430 and/or storage 420, and the console will be controlled by processor 450 executing the console's program instructions. A device 400 also includes one or a plurality of input network interfaces for communicating with other devices via a network (e.g., the internet). The device 400 further includes an electrical input interface. A device 500 also includes one or more output network interfaces 410 for communicating with other devices. Device 400 also includes input/output 440 representing devices which allow for user interaction with a computer (e.g., display, keyboard, mouse, speakers, buttons, etc.). One skilled in the art will recognize that an implementation of an actual device will contain other components as well, and that FIG. 4 is a high-level representation of some of the components of such a device for illustrative purposes. It should also be understood by one skilled in the art that the method and devices depicted in FIGS. 1 through 5 may be implemented on a device such as is shown in FIG. 5.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

We claim:

1. A FIDO ("Fast IDentity Online") authentication method comprising:
   a, in a registration stage, receiving at a first network node a request from a second network node to register a first public and first private key pair based secure data exchange by generating, at a first device at said first network node, a first challenge adapted to be signed using a first public cryptographic key, said first public key generated by a second device at said second network node as part of a public/private key pair in response to a user of said second device providing data by way of interacting with a device-local FIDO authenticator;
   storing said first private key on said second device;
   receiving, at said first device, hashed and signed data comprising said first public key from said second device causing said first device to store said first public key;
   b, in an authentication stage, receiving at said first device a request from said second device to establish a first authenticated secure data network exchange between said first device and said second device using said first public and said first private key pair;
   wherein said second device requests from said first device a FIDO challenge to sign;
   wherein said act to sign said FIDO challenge requires said second device to use said first private key to generate a correct signature, said first private key only being unlocked as a result of a successful first user verification on said second device, said successful first user verification requiring said user of said second device to interact with said device-local FIDO authenticator;
   upon said successful first user verification, receiving at said first device hashed data from said second device, wherein said hashed data comprises a signature from said second device, wherein said receiving causes said first device to determine, using said stored public key, said signature to have been correctly generated by a device possessing said first private key resulting in an authenticated secure data exchange between said first and said second network nodes;
   monitoring user inputs to said second device and determining behavioral characteristics of said user inputs during said authenticated secure data exchange;
   sending instructions to said second device instructing said second device to generate a behavioral profile for said user of said second device, said behavioral profile generating based on said behavioral characteristics;
   determining a change in said-behavioral characteristics over time, and;
   determining a score of how much said behavioral characteristics match said behavioral profile;
   during said authenticated secure data exchange, receiving at said first device a request from said second device for a further authentication challenge;
   receiving, in response to said further authentication challenge, a signed FIDO response, said signed FIDO response including data comprising said behavioral characteristics and said score to which said behavioral characteristics match said behavioral profile for said second device.

2. The FIDO authentication method of claim 1, wherein said request for a further authentication challenge and said signed FIDO response, including data comprising said behavioral characteristics and said score to which said behavioral characteristics match said behavioral profile for said second device, is received by way of a second public/private key pair based FIDO authentication scheme.

3. The FIDO authentication method of claim 1, wherein said step of determining a change in behavioral characteristics over time and said step of determining score to which said behavioral characteristics match said behavioral profile occur after said step of receiving said signed FIDO response.

4. The FIDO authentication method of claim 1, wherein said behavioral characteristics match said behavioral profile is based on a change in behavioral characteristics during said authenticated secure data exchange.

5. The FIDO authentication method of claim 4, wherein said match is further based on behavioral characteristics of a person associated with authentication credentials used in said step of sending, said behavioral characteristics determined at a time before said step of receiving.

6. The FIDO authentication method of claim 1, wherein data indicating said score to which said behavioral characteristics match includes a level of risk and a device connected to said first network node uses said level of risk to continue to send, change, or block further data sent from said first network node to said second network node.

7. The FIDO authentication method of claim 6, wherein at the authentication stage:
   said step of first user verification is not successful, resulting in sending of hashed data that fails to establish a first authenticated secure data exchange; and
   data indicating said score to which said behavioral characteristics match said behavioral profile is used by a device at said first network node as sufficient user verification to establish said first authenticated secure data exchange between said first and said second network nodes.

8. The FIDO authentication method of claim 6, where said level of risk comprises an indication for one or more of the presence of bots, remote access tools, or malware.

9. The FIDO authentication method of claim 1, wherein, said behavioral profile is linked to behavior in a previous and separate authenticated data exchange, said previous and separate authenticated data exchange selected based on a match of user authentication credentials provided by in said previous and separate authenticated data exchange matching those provided in a request to establish said authenticated secure data network connection.

10. A FIDO ("Fast IDentity Online") authentication method comprising
   a, in a registration stage, sending a request to a first network node to register a first public and first private key pair based secure data exchange by causing generation of, at a first device at said first network node, a first challenge adapted to be signed using a first public cryptographic key, said first public key generated by a second device at a second network node as part of a public/private key pair in response to a user of said second device providing data by way of interacting with a device-local FIDO authenticator;
   storing said first private key on said second device;
   sending to said first device hashed and signed data comprising said first public key and a first signature causing said first device to store said first public key;
   b, in an authentication stage, sending to said first device a request to establish a first authenticated secure data network exchange between said first device and said second device using said first public and said first private key pair;
   wherein said second device requests from said first device a FIDO challenge to sign;
   wherein signing of said FIDO challenge requires said second device to use said first private key to generate a correct signature, said first private key only being unlocked as a result of a successful first user verification on said second device, said successful first user verification requiring said user of said second device to interact with said device-local FIDO authenticator;
   upon said successful first user verification, sending to said first device hashed data, wherein said hashed data comprises a signature from said second device, wherein said sending causes said first device to determine, using said stored public key said signature to have been correctly generated by a device possessing said first private key resulting in an authenticated secure data exchange between said first and said second network nodes;
   monitoring user inputs and determining behavioral characteristics of said user inputs during said authenticated secure data exchange;
   receiving instructions to generate a behavioral profile for said user of said second device, said generating based on said behavioral characteristics;
   determining a change in said-behavioral characteristics over time, and;
   determining score to which said behavioral characteristics match said behavioral profile;
   during said authenticated secure data exchange, sending to said first device a request for a further authentication challenge;
   sending, in response to said further authentication challenge, a signed FIDO response, said signed FIDO response including data comprising said behavioral characteristics and said score to which said behavioral characteristics match said behavioral profile for said second device.

11. The method of method of 10, wherein said request for a further authentication challenge and said signed FIDO response, including data comprising said behavioral characteristics and said score to which said behavioral characteristics match said behavioral profile for said second device, is sent by way of a second public/private key pair based FIDO authentication scheme.

* * * * *